United States Patent
Chao et al.

(10) Patent No.: US 9,374,672 B1
(45) Date of Patent: Jun. 21, 2016

(54) DETECTION OF UNAUTHORIZED WIRELESS PERSONAL AREA NETWORK LOW ENERGY DEVICES

(71) Applicant: International Business Machines Corporation, Armonk, NY (US)

(72) Inventors: Zhang Chao, Beijing (CN); Qiang Guan, Scarborough (CA); Li Li, Beijing (CN); Chun hua Tian, Beijing (CN); Fengjuan Wang, Beijing (CN); Zhi Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/976,246

(22) Filed: Dec. 21, 2015

Related U.S. Application Data

(63) Continuation of application No. 14/823,042, filed on Aug. 11, 2015.

(51) Int. Cl.
*H04W 4/02* (2009.01)
*H04W 48/20* (2009.01)

(52) U.S. Cl.
CPC .............. *H04W 4/028* (2013.01); *H04W 48/20* (2013.01)

(58) Field of Classification Search
CPC .............................. H04W 4/028; H04W 48/20
USPC .......................................................... 726/23
See application file for complete search history.

(56) References Cited

U.S. PATENT DOCUMENTS

| | | | |
|---|---|---|---|
| 7,924,787 B2 * | 4/2011 | Lee ...................... | H04W 28/18 370/331 |
| 8,112,037 B2 | 2/2012 | Ketari | |
| 8,289,130 B2 | 10/2012 | Nakajima et al. | |
| 8,660,368 B2 * | 2/2014 | Datta ................. | G06K 9/00778 382/103 |
| 8,719,198 B2 * | 5/2014 | Zheng ................... | G01C 21/20 706/21 |
| 8,782,745 B2 * | 7/2014 | Stevens ............... | H04L 63/1416 726/4 |
| 2009/0122760 A1 * | 5/2009 | Kim ...................... | H04W 48/20 370/331 |
| 2011/0055928 A1 * | 3/2011 | Brindza ................ | H04W 12/08 726/26 |
| 2014/0188733 A1 * | 7/2014 | Granbery ............. | G06Q 20/202 705/64 |
| 2015/0334676 A1 * | 11/2015 | Hart ...................... | H04W 64/00 455/456.1 |

OTHER PUBLICATIONS

Chao et al., "Detection of Unauthorized Wireless Personal Area Network Low Energy Devices", U.S. Appl. No. 14/823,042, filed Aug. 11, 2015, 40 pages.

(Continued)

*Primary Examiner* — Dao Ho
(74) *Attorney, Agent, or Firm* — Christopher McLane; Daniel R. Simek

(57) ABSTRACT

In an approach for determining an unauthorized device, a computer receives detection information from a computing device, wherein the detection information includes a broadcast transmission from one or more devices. The computer creates a state trajectory map based on the received detection information, wherein the state trajectory map identifies connections between at least the computing device and a first device of the one or more devices and the computing device and a second device of the one or more devices. The computer one or more anomalies within the created state trajectory map. The computer determines an unauthorized device based on the determined one or more anomalies.

1 Claim, 3 Drawing Sheets

(56) References Cited

OTHER PUBLICATIONS

Barbeau et al., "Detecting Rogue Devices in Bluetooth Networks Using Radio Frequency Fingerprinting", Proceedings of the Third IASTED International Conference on Communications and Computer Networks, 6 pages, Oct. 4-6, 2006, Lima, Peru, <http://citeseerx.ist.psu.edu/viewdoc/download?doi=10.1.1.216.3172&rep=rep1&type=pdf>.

Chao et al., "Unauthorized Wireless Personal Area Network Low Energy Devices", U.S Appl. No. 14/823,042, filed on Aug. 11, 2015, 40 pages.

Appendix P, List of IBM Patents or Patent Applications Treated As Related, 2 pages, dated Mar. 10, 2016.

* cited by examiner

DETECTION OF UNAUTHORIZED WIRELESS PERSONAL AREA NETWORK LOW ENERGY DEVICES

BACKGROUND

The present invention relates generally to the field of indoor positioning systems, and more particularly to identifying unauthorized wireless personal area network low energy devices.

Indoor positioning systems (IPS) are solutions to locate objects and/or people within a building (e.g., store, venue, public service building, etc.) or designated area through sensory information collected by a mobile device. Instead of utilizing satellites, IPS solutions rely on different technologies, including distance measurement to nearby anchor nodes (e.g., nodes with known positions, such as WiFi® access points), magnetic positioning, and dead reckoning. The IPS either actively locates mobile devices and tags or provides ambient location or environmental content for devices to be sensed. Magnetic positioning utilizes a mobile device to measure magnetic disturbances in the Earth's magnetic field. The magnetic disturbances, when mapped, provide a digital representation of a building's floor plan. Dead reckoning is the process of calculating the current position of an individual by using a previously determined position, or a position derived from measuring external reference points, and advancing that position based upon known or estimated speeds over an elapsed time and course.

Beacons are a class of wireless personal area network low energy devices that broadcast a universally unique identifier (UUID) to nearby portable electronic devices. The UUID is a standard identifying system that allows a unique number (e.g., 128 bits, split into five groups with a major and a minor value) to be generated for the purpose of distinguishing beacons in one network from all other beacons in other networks. The major ID value identifies and distinguishes a specific group. For example, in a two-story building, beacons placed on each of the two floors are assigned a major value specific to the floor the beacons are located on. In other words, all the beacons on the first floor share the same major value, which is different from the major value shared by the beacons on the second floor. The minor value identifies and distinguishes an individual within a group. Continuing the example, on the first floor, beacons are located in a men's, women's, and children's departments. While the major values for each of the beacons indicate the three beacons are on the first floor, each individual beacon includes a unique minor value that distinguishes the beacon in the men's, women's, and children's departments from one another. The identifier (UUID, major ID, and minor ID) can therefore be used to determine the physical location of a mobile device and/or trigger a location-based action of the mobile device, such as a check-in on social media or a push notification.

SUMMARY

Aspects of the present invention disclose a method, computer program product, and system for determining an unauthorized device. The method includes one or more computer processors receiving detection information from a computing device, wherein the detection information includes a broadcast transmission from one or more devices. The method further includes one or more computer processors creating a state trajectory map based on the received detection information, wherein the state trajectory map identifies connections between at least the computing device and a first device of the one or more devices and the computing device and a second device of the one or more devices. The method further includes one or more computer processors determining one or more anomalies within the created state trajectory map. The method further includes one or more computer processors determining an unauthorized device based on the determined one or more anomalies.

DETAILED DESCRIPTION

Mobile commerce has changed the dynamic between buyers and sellers. In the new digital "always connected" age, mobile technologies may be used to enhance the experience of a buyer when in a store and provide the seller with an opportunity to gather contextual insight into buyer behavior, such as location, intent, direction, time, activity, and identity through indoor positioning systems. Based on a wireless personal area network (e.g., Bluetooth®) low energy server location, a mobile application and/or centralized server is capable of determining the location of a mobile device. However, as recognized by embodiments of the present invention, wireless personal area network low energy devices may be duplicated when a universally unique identifier (UUID), major ID, and minor ID of an unauthorized wireless personal area network low energy device are configured to be the same as a dedicated low energy device, thus causing anomalies in the indoor positioning system. Embodiments of the present invention detect and identify the unauthorized wireless personal area network low energy device through moving device state transition analytics.

Figure 1:
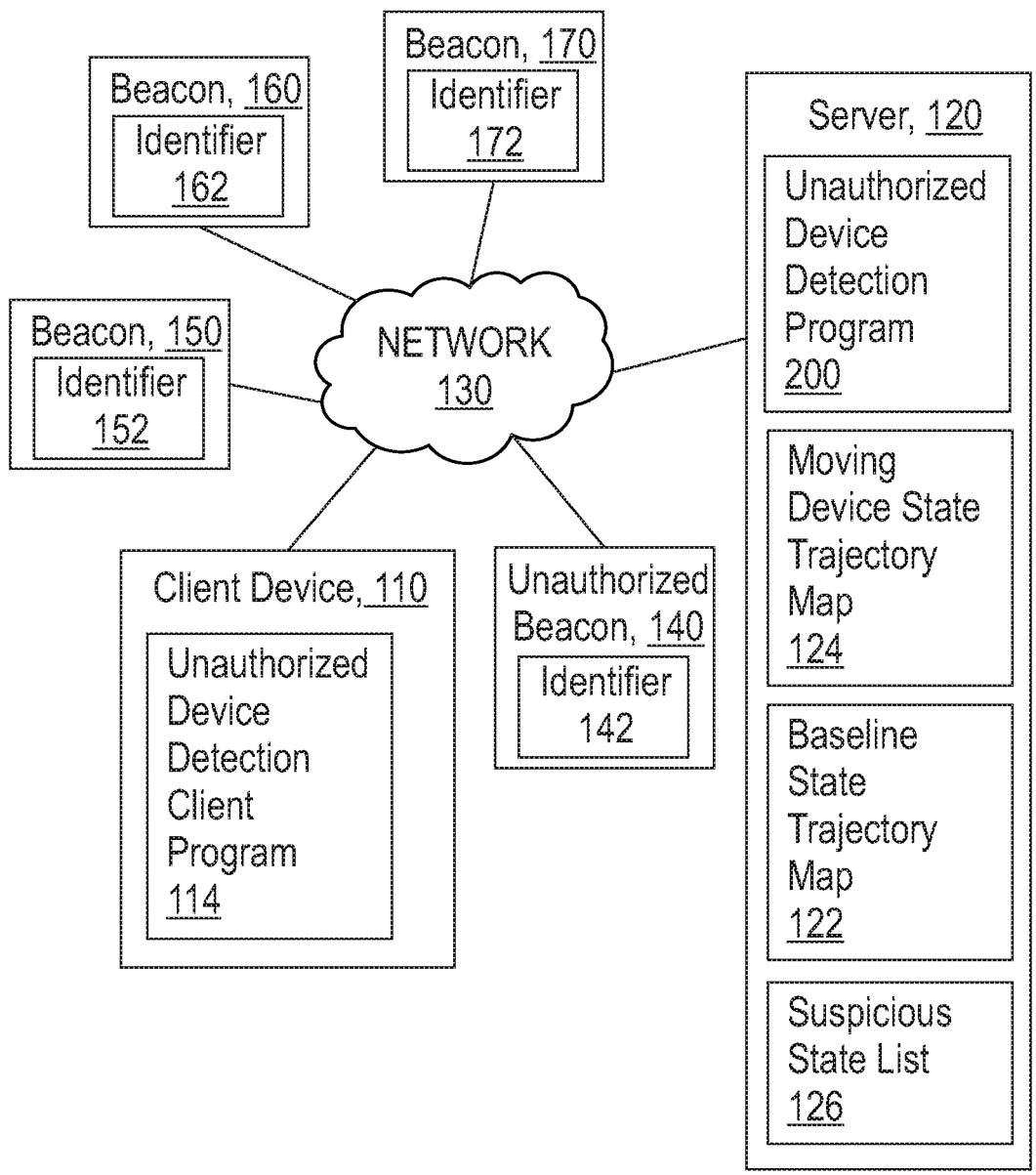
FIG. 1 is a functional block diagram illustrating an indoor positioning system environment, in accordance with an embodiment of the present invention.

The present invention will now be described in detail with reference to the Figures. FIG. 1 is a functional block diagram illustrating an indoor positioning system environment, generally designated 100, in accordance with one embodiment of the present invention. FIG. 1 provides only an illustration of one embodiment and does not imply any limitations with regard to the environments in which different embodiments may be implemented.

In the depicted embodiment, indoor positioning system environment 100 includes client device 110, unauthorized beacon 140, server 120, beacon 150, beacon 160, and beacon 170 all interconnected over network 130. Indoor positioning system environment 100 may include additional computing devices, mobile computing devices, servers, computers, storage devices, beacons, or other devices not shown.

Client device 110 may be any electronic device or computing system capable of processing program instructions and receiving and sending data over a wireless personal area network (WPAN). In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In general, client device 110 is representative of any electronic device or combination of electronic devices capable of executing machine readable program instructions, in accordance with embodiments of the present invention. In the depicted embodiment, client device 110 is a WPAN enabled device and receives a broadcast transmission from one or more of: unauthorized beacon 140, and beacons 150, 160, and 170 through a receiver (e.g., hardware of client device 110 includes the receiver). Client device 110 contains unauthorized device detection client program 114, which collects beacon data and sends the beacon data to unauthorized device detection program 200.

Unauthorized device detection client program 114 is a program installed on client device 110 that communicates with unauthorized device detection program 200 over network 130. When client device 110 receives a broadcast transmission from one or more beacons, unauthorized device detection client program 114 sends the associated UUID, major ID, minor ID, received signal strength indicator (RSSI) value (e.g., strength of the signal received by client device 110 from unauthorized beacon 140, beacon 150, 160, or 170), and reference power level (e.g., factory-calibrated, read-only constant with expected RSSI value at a specified distance from unauthorized beacon 140, beacon 150, 160, or 170) to unauthorized device detection program 200. In the depicted embodiment, unauthorized device detection client program 114 resides on client device 110. In another embodiment, unauthorized device detection client program 114 may reside on additional client devices (not shown), provided the client devices are WPAN enabled.

Unauthorized beacon 140, beacon 150, beacon 160, and beacon 170 are WPAN low energy devices that broadcast associated identifiers 142, 152, 162, and 172 to nearby portable electronic devices, such as client device 110. Beacons 150, 160, and 170 are part of a deployed indoor positioning system. Unauthorized beacon 140 is not included in the deployed indoor positioning system but appears to be a part of the deployed indoor positioning system as unauthorized beacon 140 is assigned the same UUID, major ID, and minor ID as a beacon within the deployed indoor positioning system. For example, the deployed indoor positioning system includes two identical beacons as the beacons share the same information (e.g., UUID, major ID, and minor ID), but the two beacons are in different locations. In one embodiment, unauthorized beacon 140 is stationary (e.g., fixed position). In another embodiment, unauthorized beacon 140 is mobile (e.g., position changes). Unauthorized beacon 140 and beacons 150, 160, and 170 utilize proximity sensing capabilities in order to transmit the UUID, major ID, and minor ID to a compatible application or operating system installed on client device 110. In the depicted embodiment, unauthorized beacon 140 and beacons 150, 160, and 170 are included in indoor positioning system environment 100. In another embodiment, additional beacons, (e.g., authorized and/or unauthorized) that are not shown, may be included in indoor positioning system environment 100. In some other embodiment, fewer beacons may be included within indoor positioning system environment 100 provided at least one beacon is available to client device 110 and unauthorized device detection program 200.

Identifiers 142, 152, 162, and 172 include a universally unique identifier (UUID), major ID, and minor ID. A universally unique identifier (UUID) is a unique 128 bit number assigned to unauthorized beacon 140 and beacons 150, 160, and 170 respectively. In one embodiment, the UUIDs are assigned once generated through variants that indicate the layout of the UUIDs such as: host address and time stamp, distributed computing environment (DCE) security, MD5 hash and namespace, random, or SHA-1 hash and namespace. In another embodiment, the UUIDs are assigned by a system administrator. Additionally, identifiers 142, 152, 162, and 172 include a major ID that maps to a zone (e.g., an area such as an entire floor or portion of a floor) within a building as identified by the indoor positioning system associated with unauthorized device detection program 200 and a minor ID that individually identifies each of the beacons within the zone. In the depicted embodiment, identifier 142 is a duplicate of identifier 152, identifier 162, or identifier 172 (e.g., includes the same UUID, major ID, and minor ID) and is therefore an unauthorized device. Identifiers 152, 162, and 172 are uniquely assigned identifiers for beacons 150, 160, and 170 respectively that are included within an indoor positioning system and are therefore authorized devices.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110, unauthorized beacon 140, beacon 150, beacon 160, and beacon 170 over network 130. In other embodiments, server 120 may represent a server computing system utilizing multiple computers as a server system, such as in a cloud computing environment. Server 120 contains baseline state trajectory map 122, moving device state trajectory map 124, suspicious state list 126, and unauthorized device detection program 200.

Baseline state trajectory map 122 and moving device state trajectory map 124 are state diagrams. State diagrams are a type of directed graph in which the graph vertices (e.g., nodes) represent states that are connected and directed from one graph vertex to another by graph edges that represent actions describing the behavior of a system. Two vertices are called adjacent when a common edge is shared (e.g., joins two vertices). An edge and a vertex on the edge are called incident. When two vertices are connected in two directions, the edges are considered distinct directed edges. The neighborhood of a vertex in a graph is the set of vertices adjacent to the vertex but does not include the vertex.

Baseline state trajectory map 122 identifies the manners in which an RSSI can arrive at client device 110 without crossing the zone of another beacon and is feasible with regards to a physical facility (e.g., structure of a building) wherein an edge connecting two vertices denotes the zones are neighbors. Additionally, the edges within baseline state trajectory map 122 may include additional information, such as transition time distribution and transition possibilities from the starting vertex to the end vertex. In one embodiment, baseline state trajectory map 122 may be created manually based on a physical facility layout and a beacon layout (e.g., placement of beacons 150, 160, and 170 within a building). In another embodiment, baseline state trajectory map 122 may be created based on historical trajectory patterns (e.g., analysis of the trajectory of moving objects in terms of space and time). In some other embodiment, baseline state trajectory map 122 may be created based on the physical facility layout and beacon layout combined with the historical trajectory patterns. In the depicted embodiment, baseline state trajectory map 122 resides on server 120. In another embodiment, baseline state trajectory map 122 may reside on other computing devices and servers (not shown), in accordance with embodiments of the inventions provided baseline state trajectory map 122 is accessible by unauthorized device detection program 200.

Moving device state trajectory map 124 identifies the state trajectory of a moving client device (e.g., client device 110). Moving device state trajectory map 124 collects the trajectory (e.g., including stationary and moving states) of client device 110 over time, thus providing the path a moving device follows through a physical facility combined with RSSI from beacons 150, 160, and/or 170. In the depicted embodiment, moving device state trajectory map 124 resides on server 120. In some other embodiment, moving device state trajectory map 124 may reside on other computing devices and servers (not shown), in accordance with embodiments of the inventions provided moving device state trajectory map 124 is accessible by unauthorized device detection program 200.

Suspicious state list 126 is a list of anomalies identified by unauthorized device detection program 200 by comparing moving device state trajectory map 124 to baseline state trajectory map 122. An anomaly occurs when a trajectory path is not feasible (e.g., unable to occur due to a physical or locational constraint) with regards to baseline state trajectory map 122. For example, moving device state trajectory map 124 passes through a wall of the building. Baseline state trajectory map 122 includes the wall of the building and does not indicate a path through the wall. As a user of client device 110 cannot actually pass through the wall, the trajectory path is not feasible. In another example, moving device state trajectory map 124 indicates the trajectory path between two beacons that are not identified within baseline state trajectory map 122 as neighbors; therefore, the trajectory path is not feasible. As unauthorized device detection program 200 identifies anomalies, unauthorized device detection program 200 appends suspicious state list 126 with the identified additional anomalies for future use in order to determine unauthorized beacon 140. In one embodiment, suspicious state list 126 is the result of anomalies identified by unauthorized device detection program 200 from a single client device (e.g., client device 110). In another embodiment, suspicious state list 126 is the result of anomalies identified by unauthorized device detection program 200 from multiple client devices (e.g., client device 110 and additional client devices not shown). In the depicted embodiment, suspicious state list 126 resides on server 120. In some other embodiment, suspicious state list 126 may reside on other computing devices and servers (not shown), in accordance with embodiments of the inventions provided moving device state trajectory map 124 is accessible by unauthorized device detection program 200.

Unauthorized device detection program 200 is a program that determines an unauthorized WPAN enabled device, such as unauthorized beacon 140, through moving state transition trajectory analytics. Unauthorized device detection program 200 receives the RSSI state of unauthorized beacon 140, and beacons 150, 160, and 170 from unauthorized device detection client program 114 and creates moving device state trajectory map 124. Unauthorized device detection program 200 compares moving device state trajectory map 124 to baseline state trajectory map 122 and creates suspicious state list 126, from which unauthorized device detection program 200 ultimately determines unauthorized beacon 140. In the depicted embodiment, unauthorized device detection program 200 resides on server 120. In another embodiment, unauthorized device detection program 200 resides on other computing devices and servers (not shown), in accordance with embodiments of the inventions.

Network 130 may be a local area network (LAN), a wide area network (WAN), such as the Internet, a wireless local area network (WLAN), wireless personal area network (WPAN), such as Bluetooth®, any combination thereof, or any combination of connections and protocols that will support communications between client device 110, unauthorized beacon 140, server 120, beacon 150, beacon 160, beacon 170, and other computing devices and servers (not shown), in accordance with embodiments of the inventions. Bluetooth® is a wireless technology standard for exchanging data over short distances from fixed and mobile devices building a personal area network (PAN) or WPAN. Network 130 may include wired, wireless, or fiber optic connections. In the depicted embodiment, network 130 represents a wireless personal area network (e.g., Bluetooth®).

Figure 2:
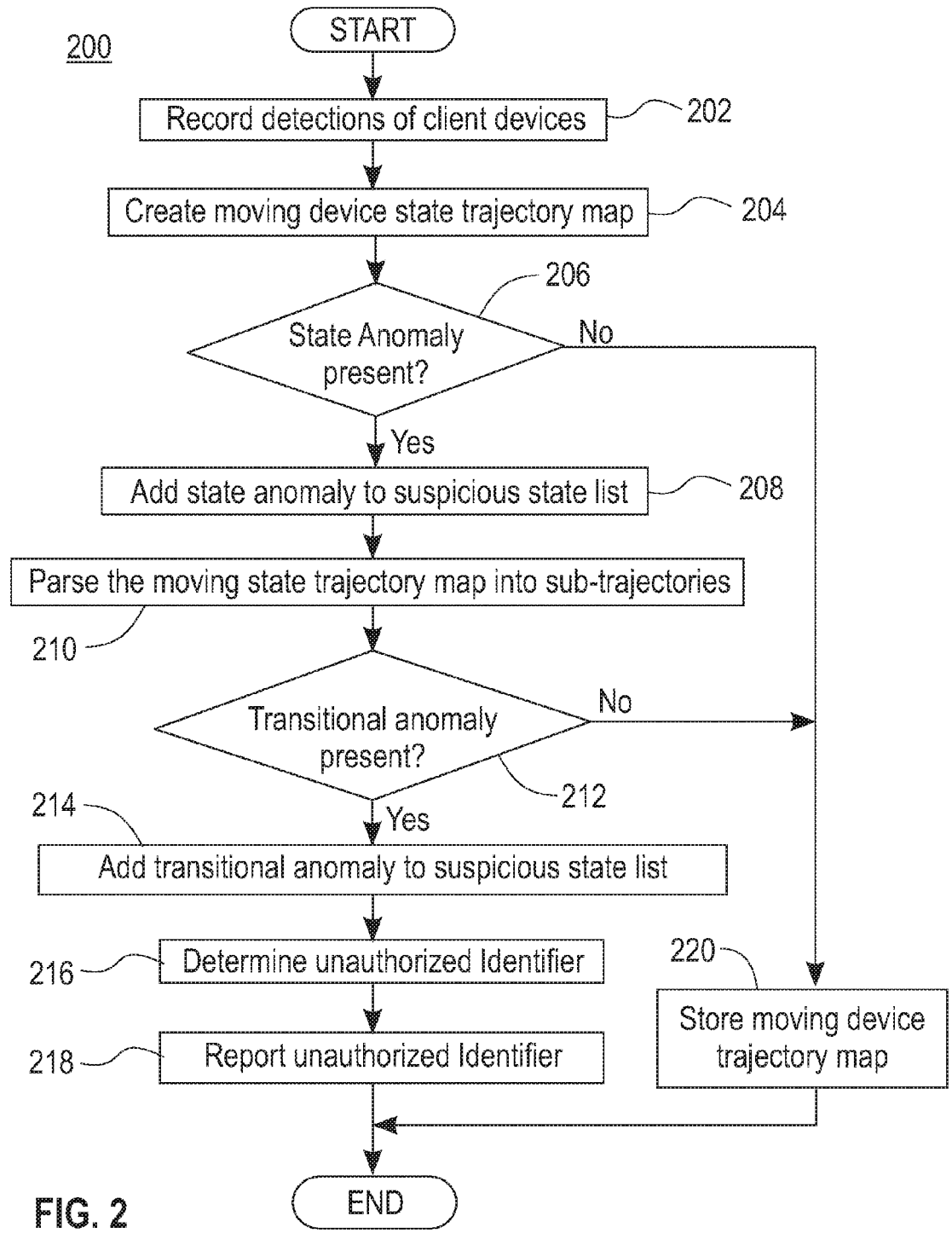
FIG. 2 is a flowchart depicting operational steps of an unauthorized device detection program on a server computer within the indoor positioning system environment of FIG. 1 for detecting unauthorized wireless personal area network low energy devices through state transition diagrams, in accordance with an embodiment of the present invention.

FIG. 2 is a flowchart depicting operational steps of an unauthorized device detection program 200, a program for detecting unauthorized wireless personal area network low energy devices through state transition diagrams, in accordance with an embodiment of the present invention. In one embodiment, unauthorized device detection program 200 is incorporated as part of an indoor positioning system. In another embodiment, unauthorized device detection program 200 is a stand-alone program that sends results to an indoor positioning system. Prior to initiating, unauthorized device detection client program 114 is installed on client device 110, and client device 110 is enabled to receive broadcast transmissions from a personal area work (e.g., network 130). The broadcast transmission can include the UUID, major ID, minor ID for an identifier (e.g., identifiers 142, 152, 162, or 172), and the respective RSSI level and reference power level. Unauthorized device detection program 200 initiates once the operating system associated with client device 110 receives a broadcast transmission from unauthorized beacon 140, beacons 150, 160, and/or 170 and sends received information from the broadcast transmission to unauthorized device detection program 200 via unauthorized device detection client program 114. At any time, unauthorized beacon 140 may be detected by client device 110 as any beacon (e.g., beacon 150, beacon 160, beacon 170) present in the indoor positioning system when identifier 142 is assigned the same UUID, major ID, and minor ID as associated with another beacon (e.g., identifier 152, identifier 162, or identifier 172).

In step 202, unauthorized device detection program 200 records detections from client device 110. Depending upon a location of client device 110 and the position and/or range of unauthorized beacon 140, beacons 150, 160, and 170, client device 110 may detect one or more beacons. Range refers to the area a transmission covers in which the signal strength is sufficient for a receiver to detect the signal. In one embodiment, unauthorized device detection program 200 receives detection information (e.g., broadcast transmission) for one beacon via unauthorized device detection client program 114. For example, within a store, beacon 150 is located near the front entrance, beacon 160 is located at the middle of the store, and beacon 170 is located at the rear of the store. The user of client device 110 is located just inside the front entrance of the store near beacon 150. Due to the range of beacons 150, 160, and 170 and the position of client device 110, unauthorized device detection program 200 only receives the broadcast transmission information and RSSI level associated with beacon 150 as collected and sent by client device 110 via unauthorized device detection client program 114.

Unauthorized device detection program 200 receives additional broadcast transmission information and RSSI levels via unauthorized device detection client program 114 over time. In one embodiment, the broadcast information and RSSI levels may be received for the same beacons as a previous transmission; however, the RSSI levels may change (e.g., as the position of client device 110 changes). For example, as client device 110 moves to the rear of the store, unauthorized device detection program 200 receives a decreasing RSSI level for beacon 150 and an increasing RSSI level for beacon 160 (e.g., indicates client device 110 is moving away from beacon 150 and closer to beacon 160). In another embodiment, the broadcast information and RSSI levels may include information regarding different beacons in addition to changing RSSI levels. For example, client device 110 is no longer within range of beacon 150, is closest to beacon 160, but also within range of beacon 170. Unauthorized device detection program 200 receives broadcast transmission information and RSSI levels via unauthorized device detection client program 114 for beacons 160 and 170; however, beacon 150 is no longer included. In some other embodiment, unauthorized device detection program 200 receives additional broadcast transmission information and RSSI levels via unauthorized device detection client program 114 over time that do not change (e.g., client device is stationary, no movement occurs).

In another embodiment, unauthorized device detection program 200 receives detection information for multiple beacons via unauthorized device detection client program 114. Continuing the example, the user of client device 110 moves though the store and is currently halfway between beacon 150 and beacon 160, and is therefore within range of both beacon 150 and beacon 160. Unauthorized device detection program 200 receives the broadcast transmission information and RSSI levels associated with both beacon 150 and beacon 160 as collected by client device 110 and sent via unauthorized device detection client program 114.

In one embodiment, unauthorized device detection program 200 receives additional broadcast transmission information and RSSI levels via unauthorized device detection client program 114 in real-time (e.g., receives information as client device 110 receives broadcast transmissions from one or more beacons). Real-time refers to a system state that controls an environment by receiving data, processing the data, and returning the results in a manner able to affect the environment at that time. For example, unauthorized device detection program 200 receives broadcast transmission information and RSSI levels from unauthorized device detection client program 114 virtually immediately upon receipt of the broadcast transmission by client device 110 without a specified time interval.

In another embodiment, unauthorized device detection program 200 receives additional broadcast transmission information and RSSI levels via unauthorized device detection client program 114 as batches. Batches refer to the receipt and processing of received data at a later time, as specified by a set of criteria (e.g., a period of time, a set number of detections, change in the RSSI level by a specified magnitude, etc., within the indoor positioning system) that unauthorized device detection program 200 receives as a group of multiple instances of occurrence once the specified criteria is met. For example, unauthorized device detection program 200 receives broadcast transmission information and RSSI levels via unauthorized device detection client program 114 every five minutes. Client device 110 receives broadcast transmissions and RSSI levels as sent by the beacons and stores the received information within memory over the five-minute time period. The received information may include multiple changes pertaining to the RSSI levels, and the beacons detected. At completion of the specified time interval, unauthorized device detection client program 114 sends the stored information to unauthorized device detection program 200 for all detections recorded over the five-minute time period. Unauthorized device detection program 200 records the information with the associated beacons for the specified time frame for processing.

In step 204, unauthorized device detection program 200 creates moving device state trajectory map 124. Unauthorized device detection program 200 utilizes the broadcast transmissions as the basis of moving device state trajectory map 124. Within moving device state trajectory map 124, unauthorized device detection program 200 represents one or more beacons as a node (e.g., zone). Unauthorized device detection program 200 represents connections between the beacons as lines indicating the beacon is reached (e.g., movement from one beacon to the next beacon is possible and occurs). Unauthorized device detection program 200 does not connect beacons that cannot reach another beacon directly. For example, movement from beacon 150 at the front of the store to beacon 170 at the rear of the store is not possible without passing through the area covered by beacon 160 in the middle of the store. Therefore, a direct connection between beacon 150 and beacon 170 does not exist.

For example, unauthorized device detection program 200 receives a set of batch information from unauthorized device detection client program 114 for beacons 150, 160, and 170. The batch information includes a progression of movement over time starting with beacon 150, followed by beacon 160, and ending with beacon 170 (e.g., changes in the state of the RSSI levels relate to movement and direction associated with client device 110). Unauthorized device detection program 200 creates individual nodes for identified beacons (e.g., beacon 150, beacon 160, and beacon 170). Unauthorized device detection program 200 determines connections between beacons 150, 160, and 170 based on the order in which the received transmission broadcasts occur over time and connects beacon 150 to beacon 160 and connects beacon 160 to beacon 170 within moving device state trajectory map 124. As the batch information does not indicate detection of a transmission broadcast directly between beacon 150 and beacon 170, unauthorized device detection program 200 does not connect beacon 150 to beacon 170 within moving device state trajectory map 124.

In decision 206, unauthorized device detection program 200 determines whether a state anomaly is present within moving device state trajectory map 124. In general, the state anomaly (e.g., single state and multiple state) represents a connection (e.g., transition path) within moving device state trajectory map 124 that is not feasible with respect to baseline state trajectory map 122. Unauthorized device detection program 200 retrieves baseline state trajectory map 122 from memory. Unauthorized device detection program 200 compares moving device state trajectory map 124 to baseline state trajectory map 122 to determine anomalies. In one embodiment, unauthorized device detection program 200 determines a single state anomaly in which unauthorized device detection program 200 determines the connection between one or more beacons is not possible due to location of the beacons and/or physical facility limitations (e.g., connection between beacon 150 and beacon 170). Unauthorized device detection program 200 compares the order in which connections between the beacons of moving device state trajectory map 124 through the movements of client device 110, with the predefined connections between the beacons of baseline state trajectory map 122 (e.g., includes the potential connections and paths available for client device 110 to move within).

For example, a second occurrence of beacon 150 (e.g., unauthorized beacon 140) is placed within proximity of beacon 170. Moving device state trajectory map 124 indicates a connection between beacon 150 and beacon 170. When unauthorized device detection program 200 compares moving device state trajectory map 124 with baseline state trajectory map 122, the connection between beacon 150 and beacon 170 is not present. Due to the anomaly, unauthorized device detection program 200 determines a single state anomaly is present in moving device state trajectory map 124.

In another embodiment, unauthorized device detection program 200 determines a multiple state anomaly. In a multiple state anomaly, unauthorized device detection program 200 determines a trajectory within moving device state trajectory map 124 includes multiple medium states (e.g., data associated with a single beacon includes more than one broadcast transmission and RSSI level at the same time). In one embodiment, unauthorized device detection program 200 determines multiple medium states when the identifier (e.g., identifier 152) of a beacon, such as beacon 150, is replicated, and a second occurrence of beacon 150 (e.g., unauthorized beacon 140, in which identifier 142 is the same as identifier 152) is included within moving device state trajectory map 124 (e.g., two different locations identify the same beacon). In another embodiment, unauthorized device detection program 200 determines multiple medium states after receiving different RSSI levels associated with one or more beacons (e.g., beacon 150 and unauthorized beacon 140 share an area) at the same time.

For example, a second occurrence of beacon 150 (e.g., unauthorized beacon 140) is placed within proximity of a first occurrence of beacon 150, but the second occurrence of beacon 150 (e.g., unauthorized beacon 140) is also within proximity of beacon 160 and beacon 170. Unauthorized device detection program 200 determines the connection between beacon 150 (e.g., unauthorized beacon 140) and beacon 170 as a single state anomaly. Additionally, unauthorized device detection program 200 receives two sets of broadcast transmission information for beacon 160 but with different RSSI levels (e.g., conflicting information creating multiple data points within moving device state trajectory map 124). Unauthorized device detection program 200 determines a multiple state anomaly relative to the multiple connection states (e.g., receives multiple RSSI levels for the same connections) that occur between beacon 150 and beacon 160 and unauthorized beacon 140 and beacon 160. Therefore, unauthorized device detection program 200 determines multiple anomalies are present in moving device state trajectory map 124.

If unauthorized device detection program 200 determines a state anomaly is present within moving device state trajectory map 124 (decision 206, yes branch), then unauthorized device detection program 200 adds the anomaly to suspicious state list 126 (step 208). If unauthorized device detection program 200 determines a state anomaly is not present within moving device state trajectory map 124 (decision 206, no branch), then unauthorized device detection program 200 stores moving device state trajectory map 124 (step 220).

In step 208, unauthorized device detection program 200 adds the anomaly to suspicious state list 126. Unauthorized device detection program 200 includes the identifier, the UUID, major ID, and minor ID associated with the state anomaly, a transition time (e.g., elapsed time associated with the movement between beacons), and the zones associated with the state anomaly. In one embodiment, unauthorized device detection program 200 creates a new occurrence of suspicious state list 126 and adds the state anomaly (e.g., creates a new list upon receipt of first transmission from client device 110). In another embodiment, unauthorized device detection program 200 adds the state anomaly to a previously created version of suspicious state list 126 (e.g., appends suspicious state list 126 over time associated with client device 110). In some other embodiment, unauthorized device detection program 200 adds the state anomaly to a composite version of suspicious state list 126 (e.g., compilation of information from multiple client devices in one list) for later processing.

In step 210, unauthorized device detection program 200 parses moving device state trajectory map 124 into sub-trajectories. Unauthorized device detection program 200 breaks moving device state trajectory map 124 into the component pieces (e.g., individual segments of connections between beacons 150, 160, and 170, etc.). Unauthorized device detection program 200 identifies the portions of moving device state trajectory map 124 that include the single state anomalies and/or multiple state anomalies and discards the associated connections, as the anomalies are already identified and stored in suspicious state list 126 for later processing. Unauthorized device detection program 200 maintains the feasible portions of moving device state trajectory map 124 for further processing (e.g., determine whether additional anomalies are present).

For example, the connection between beacon 160 and beacon 170 does not include a single state and/or multiple state anomaly, and unauthorized device detection program 200 stores the connection between beacon 160 and beacon 170 for further processing (e.g., anomaly may be present but not obvious). However, the connection between beacon 150 and beacon 170 and the connection between beacon 150 and/or unauthorized beacon 140 and beacon 160 include previously identified anomalies, and unauthorized device detection program 200 discards the connections as the single/multiple state anomalies are already included within suspicious state list 126.

In decision 212, unauthorized device detection program 200 determines whether a transitional anomaly is included within the sub-trajectories. Unauthorized device detection program 200 compares the sub-trajectories from moving device state trajectory map 124 with the corresponding feasible connections within baseline state trajectory map 122 with respect to rules, such as neighbors, transition time, and business rules. Beacons are considered to be neighbors, part of the neighborhood or sharing a neighbor relationship, when an area surrounding a first beacon is adjacent to an area of a second beacon and allows movement between the areas covered by adjacent beacons (e.g., first and second beacons) without moving through the area covered by a third beacon first. In one embodiment, unauthorized device detection program 200 determines the transitional anomaly when the connection is not identified as a neighbor within baseline state trajectory map 122 (e.g., does not identify a matching connection with the same endpoints).

For example, in the physical layout of a store, the women's department (location of beacon 150) is adjacent to the junior girls' department (location of beacon 160), and junior boys (location of beacon 170) is adjacent to junior girls but not adjacent to the women's department (e.g., junior girls' department is located between the women's department and junior boys' department). Unauthorized device detection program 200 determines the junior girls' department is a neighbor of the women's department as the areas covered by beacons 150 and 160 are adjacent and an individual does not need to pass through the area covered by beacon 170 prior to move between the women's department and junior girls' department. Unauthorized device detection program 200 determines the junior boys' department is not a neighbor of the women's department as the areas covered by beacons 150 and 170 are not adjacent and an individual cannot directly reach the junior boys' department from the women's department without first passing through the junior girls' department covered by beacon 160. Therefore, unauthorized device detection program 200 determines the sub-trajectory from moving device state trajectory map 124 (e.g., connection between unauthorized beacon 140, replicating beacon 150, and 170) does not match an identified connection (e.g., connection between beacons 150 and 160 and connection between beacons 160 and 170) within the feasible connections within baseline state trajectory map 122 and identifies the sub-trajectory as a transitional anomaly.

In another embodiment, unauthorized device detection program 200 determines a transitional anomaly is included when the transition time (e.g., minimum amount of time) is outside of the anticipated time range of a state pair (e.g., connection between two beacons). Unauthorized device detection program 200 includes a minimum transition time for a changeover between beacons. In one embodiment, unauthorized device detection program 200 may utilize a predetermined minimum transition time at the time the indoor positioning system is installed (e.g., estimated transition time to travel from one beacon to another beacon). In some other embodiment, unauthorized device detection program 200 determines a minimum transition time based on averaging the transition time from previous valid occurrences of moving device state trajectory map 124. Unauthorized device detection program 200 calculates the transition time between the detection of a first broadcast transmission at a first beacon (e.g., beacon 150) and the detection of a second broadcast transmission at a second beacon (e.g., beacon 160). Unauthorized device detection program 200 compares the calculated transition time with the minimum transition time. Unauthorized device detection program 200 determines a transitional anomaly is present when the transition time associated with the connection within moving device state trajectory map 124 is less than the minimum transition time associated with the same connection within baseline state trajectory map 122.

For example, a second occurrence of beacon 150 (e.g., unauthorized beacon 140) is present in the women's department. The minimum transition time from the first occurrence of beacon 150 to be within range of beacon 160 is five minutes based on average walking speeds of individuals. Unauthorized device detection program 200 receives a transmission broadcast from unauthorized device detection client program 114 regarding beacon 160 and calculates the transition time between the broadcast transmissions associated with beacon 150 (e.g., unauthorized beacon 140) and beacon 160 to be one minute. Unauthorized device detection program 200 compares the transition time of one minute with the minimum transition time of five minutes and determines a transitional anomaly is present in the connection between beacon 150 and beacon 160.

In some other embodiment, unauthorized device detection program 200 determines a transitional anomaly is included based on a defined business rule. A business rule defines or constrains an aspect of unauthorized device detection program 200. The business rule may be added as a constraint to unauthorized device detection program 200 at any time (e.g., at install, once operational, responsive to determining errors, etc.). For example, an area in a store with a beacon is closed due to construction. Normally another area is accessible by passing through the closed area; however, construction prevents movement through the area. A business rule is therefore entered into unauthorized device detection program 200 and identifies the area with the beacon as closed. Unauthorized device detection program 200 thereby identifies broadcast transmissions and connections associated with the beacon within the closed area as a transitional anomaly resulting from unauthorized beacon 140.

If unauthorized device detection program 200 determines a transitional anomaly is included within the sub-trajectories (decision 212, yes branch), then unauthorized device detection program 200 adds the transitional anomaly to suspicious state list 126 (step 214). If unauthorized device detection program 200 determines a transitional anomaly is not included (e.g., rules are not violated) within the sub-trajectories (decision 212, no branch), then unauthorized device detection program 200 stores moving device state trajectory map 124 (step 220).

In step 214, unauthorized device detection program 200 adds the transitional anomaly to suspicious state list 126. Unauthorized device detection program 200 includes the UUIDs associated with the transitional anomaly, a transition time (e.g., elapsed time associated with the movement between beacons), and the zones associated with the transitional anomaly. In one embodiment, unauthorized device detection program 200 adds the transitional anomaly to a previously created version of suspicious state list 126 (e.g., appends suspicious state list 126 to include state and transitional anomalies for a single client device). In some other embodiment, unauthorized device detection program 200 adds the transitional anomaly to a composite version of suspicious state list 126 (e.g., compilation of information from multiple client devices in one list of both state and transitional anomalies) for additional processing.

In step 216, unauthorized device detection program 200 determines an unauthorized identifier. For example, unauthorized device detection program 200 determines that identifier 142 is unauthorized. In one embodiment, unauthorized device detection program 200 identifies unauthorized identifier 142 as suspicious state list 126 (e.g., all beacons identified in suspicious state list 126 are associated with identifier 142). In another embodiment, unauthorized device detection program 200 identifies identifier 142 as unauthorized based on a frequency of occurrence (e.g., highest frequency) within suspicious state list 126. For example, identifier 152 occurs twenty times, identifier 162 occurs eight times, and identifier 172 occurs two times within suspicious state list 126. Unauthorized device detection program 200 determines identifier 152 has the highest frequency of occurrence with twenty transitional anomalies and determines identifier 152 is associated with unauthorized beacon 140, and therefore includes detections of identifier 142 duplicating identifier 152, which results in erroneous data (e.g., determines which beacon unauthorized beacon 140 duplicates).

In some other embodiment, unauthorized device detection program 200 analyzes suspicious state list 126 for the unauthorized identifier (e.g., identifier 142) that appears in multiple connections with multiple state changes occurring over time. For example, unauthorized device detection program 200 determines identifier 152 is present in connections related to identifier 162 and identifier 172 within suspicious state list 126. Identifier 152 is a common element between the transitional anomalies and incurs changes to the multiple states over time. Therefore, unauthorized device detection program 200 identifies identifier 152 is associated with unauthorized beacon 140; and therefore, includes detections of identifier 142 duplicating identifier 152, which results in erroneous data. In some other embodiment, unauthorized device detection program 200 combines the frequency of occurrence with multiple state changes to determine that identifier 142 is unauthorized.

In step 218, unauthorized device detection program 200 reports unauthorized identifier 142. In one embodiment, unauthorized device detection program 200 notifies a system administrator of unauthorized identifier 142 for further action. For example, the system administrator receives the UUID, major ID, and minor ID that identifier 142 replicates and an approximate location based on broadcast transmission and RSSI level information. In another embodiment, unauthorized device detection program 200 stores unauthorized identifier 142 (the UUID, major ID, and minor ID) in a database for future use in subsequent iterations of unauthorized device detection program 200 (e.g., identifies beacons frequently replicated, locations of unauthorized beacon 140, etc.). Unauthorized device detection program 200 completes after reporting identifier 142 as unauthorized.

In step 220, unauthorized device detection program 200 stores moving device state trajectory map 124. In one embodiment, unauthorized device detection program 200 stores moving device state trajectory map 124 within historical data for utilization in a subsequent iteration of unauthorized device detection program 200. In another embodiment, unauthorized device detection program 200 stores moving device state trajectory map 124 as baseline state trajectory map 122 (e.g., replaces a previous version of baseline state trajectory map 122 with updates). In another embodiment, unauthorized device detection program 200 stores the portions of moving device state trajectory map 124 within the historical data for future calculations and comparisons in subsequent iterations of unauthorized device detection program 200. In some other embodiment, unauthorized device detection program 200 may store moving device state trajectory map 124 with anomalies (e.g., trajectory of a moving version of unauthorized beacon 140). Unauthorized device detection program 200 completes after storing moving device state trajectory map 124.

Figure 3:
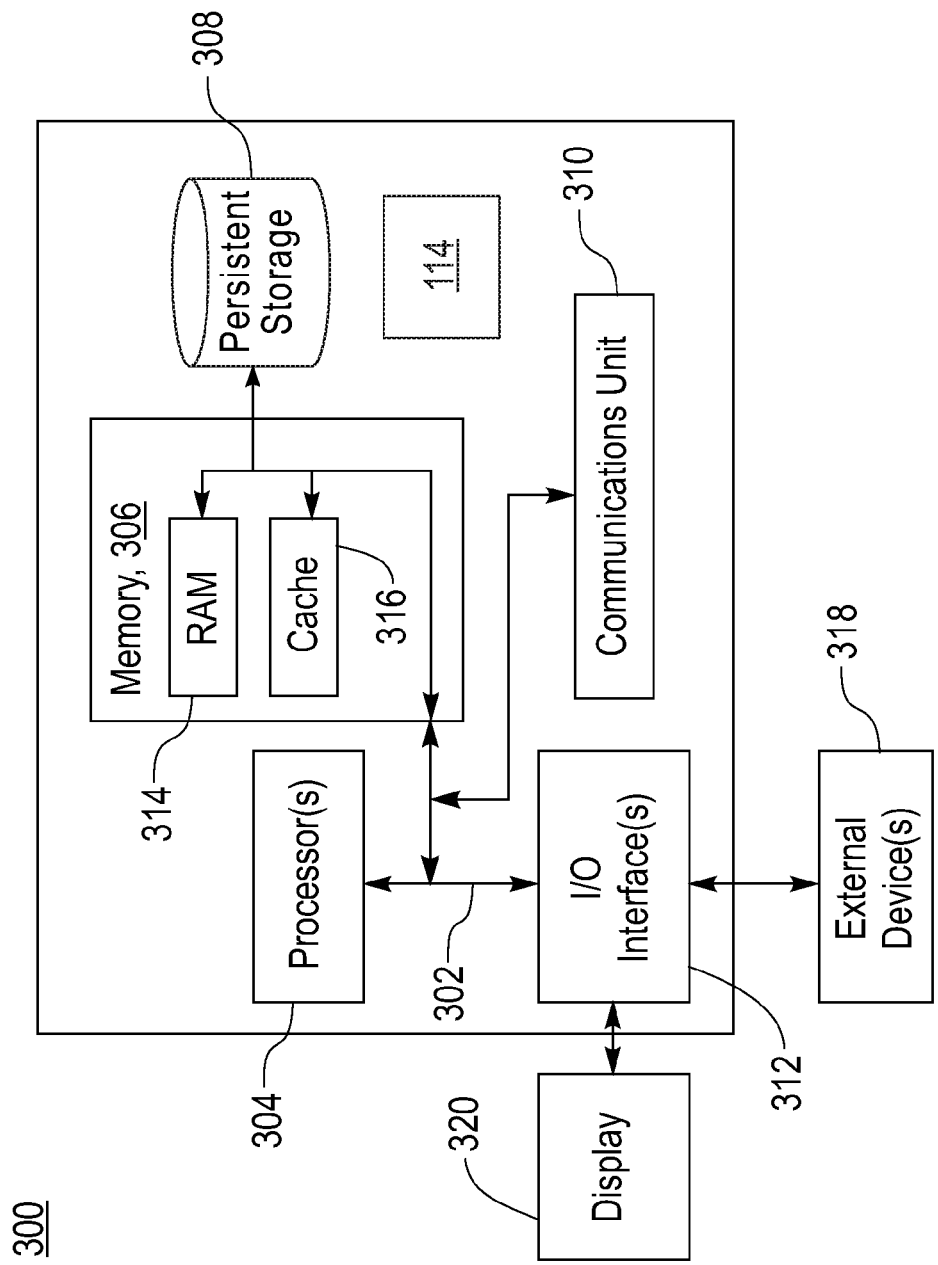
FIG. 3 is a block diagram of components of the server computer executing the unauthorized device detection program, in accordance with an embodiment of the present invention.

FIG. 3 depicts server computer 300 that is an example of a system that includes unauthorized device detection program 200. It should be appreciated that FIG. 3 provides only an illustration of one implementation and does not imply any limitations with regard to the environments in which different embodiments may be implemented. Many modifications to the depicted environment may be made.

Server computer 300 includes processor(s) 304, cache 316, memory 306, persistent storage 308, communications unit 310, input/output (I/O) interface(s) 312, and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of processor(s) 304 by holding recently accessed data, and data near recently accessed data, from memory 306.

Program instructions and data used to practice embodiments of the present invention may be stored in persistent storage 308 and in memory 306 for execution by one or more of the respective processor(s) 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Software and data used to practice embodiments of the present invention, e.g., unauthorized device detection client program 114, identifier 142, identifier 152, identifier 162, identifier 172, baseline state trajectory map 122, moving device state trajectory map 124, suspicious state list 126, and unauthorized device detection program 200 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining an unauthorized device, the method comprising:

receiving, by one of more computer processors, detection information from a computing device, wherein the detection information includes a broadcast transmission from one or more devices that are beacons associated with an indoor positioning system;

creating, by one or more computer processors, a state trajectory map based on the received detection information, wherein the state trajectory map identifies connections between at least the computing device and a first device of the one or more devices and the computing device and a second device of the one or more devices;

retrieving, by one or more computer processors, a baseline state trajectory map from memory wherein the baseline state trajectory map is based on a location of identified devices and a physical layout of a building within the indoor positioning system;

performing, by one or more computer processors, a comparison of the created state trajectory map to the baseline state trajectory map;

determining, by one or more computer processors, whether at least one state anomaly is present within the created state trajectory map based on the comparison, wherein the at least one state anomaly includes one or more of: a single state anomaly and a multiple state anomaly;

identifying, by one or more computer processors, a connection within the created state trajectory map associated with the determined at least one state anomaly;

adding, by one or more computer processors, the identified connection associated with the determined state anomaly to a suspicious state list;

responsive to determining at least one state anomaly is present within the created state trajectory map based on the comparison, parsing, by one or more computer processors, the created state trajectory map into one or more sub-trajectories that identify individual connections within the created state trajectory map;

identifying, by one or more computer processors, the parsed one or more sub-trajectories that do not include the at least one determined state anomaly;

determining, by one or more computer processors, whether the identified one or more sub-trajectories that do not include the at least one determined state anomaly include a transitional anomaly;

adding, by one or more computer processors, a sub-trajectory associated with the transitional anomaly to the suspicious state list;

analyzing, by one or more computer processors, the suspicious state list for one or more of the following: high frequency of occurrence of a universally unique identifier, and multiple connections with multiple state changes associated with a universally unique identifier;

determining, by one or more computer processor, an unauthorized device based on the analyzed suspicious state list; and reporting, by one or more computer processors, the determined unauthorized device.

* * * * *